(12) United States Patent
Wang et al.

(10) Patent No.: US 9,426,812 B2
(45) Date of Patent: Aug. 23, 2016

(54) SPECTRUM ALLOCATION METHOD

(71) Applicant: SHANGHAI RESEARCH CENTER FOR WIRELESS COMMUNICATIONS, Shanghai (CN)

(72) Inventors: Shuangdie Wang, Shanghai (CN); Jiang Wang, Shanghai (CN); Jing Xu, Shanghai (CN); Yong Teng, Beijing (CN); Horneman Kari, Oulu (FI)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 5 days.

(21) Appl. No.: 14/385,316

(22) PCT Filed: Dec. 25, 2012

(86) PCT No.: PCT/CN2012/087386
§ 371 (c)(1),
(2) Date: Sep. 15, 2014

(87) PCT Pub. No.: WO2013/135087
PCT Pub. Date: Sep. 19, 2013

(65) Prior Publication Data
US 2015/0078274 A1    Mar. 19, 2015

(30) Foreign Application Priority Data

Mar. 14, 2012    (CN) .......................... 2012 1 0066541

(51) Int. Cl.
| | | |
|---|---|---|
| *H04W 72/08* | (2009.01) |
| *H04W 16/14* | (2009.01) |
| *H04W 16/10* | (2009.01) |
| *H04W 72/04* | (2009.01) |

(52) U.S. Cl.
CPC .......... *H04W 72/082* (2013.01); *H04W 16/10* (2013.01); *H04W 16/14* (2013.01); *H04W 72/0453* (2013.01)

(58) Field of Classification Search
CPC ...................... H04W 72/0453; H04W 16/10
See application file for complete search history.

(56) References Cited

U.S. PATENT DOCUMENTS

| 6,496,490 B1 * | 12/2002 | Andrews | H04W 16/10 370/329 |
|---|---|---|---|
| 6,950,418 B1 * | 9/2005 | Young | H04W 16/14 370/314 |
| 2008/0151821 A1 * | 6/2008 | Cho | H04W 16/10 370/329 |

* cited by examiner

*Primary Examiner* — Kwang B Yao
*Assistant Examiner* — Moo Ryong Jeong
(74) *Attorney, Agent, or Firm* — Oliff PLC

(57) ABSTRACT

A spectrum allocation method for a cellular network is presented. The method includes: abstracting a cellular network into an interference pattern using a graph theory-based spectrum distribution model; a network node establishing a stakeholder list to represent whether a spectrum can be shared with other network nodes; by obtaining stakeholder lists from other network nodes, calculating a fairness coefficient and determining a lower bound value for the number of spectrum resources which are used; meanwhile, each network node sending out a value related to the fairness coefficient, thereby enables calculate an upper bound value for the number of resources which can be obtained according to the obtained information, to effectively compete for free resources. Through the method of the invention, a network node can autonomously select spectrum resources, fully and effectively achieve spectrum resource allocation fairness and global network fairness, and increase the system throughput and the edge user throughput.

8 Claims, 5 Drawing Sheets

SPECTRUM ALLOCATION METHOD

BACKGROUND OF THE PRESENT INVENTION

1. Field of Invention

The present invention belongs to the technical field of mobile communication, and relates to a spectrum allocation method, more particularly relates to a spectrum allocation method for small cell network.

2. Description of Related Arts

LTE (Long Term Evolution) and LTE-A (LTE-Advanced) systems provided by the 3rd Generation Partnership Project (3GPP) are evolutional technologies of GSM and UMTS cellular radio systems. It may provide higher spectrum efficiency and smaller network delay, so as to make more efficiently use of spectrum resources. The conventional cellular network provides service to the user by using a Macro Base Station (MBS), but with the change in business requirements, the new generation of wireless communication system has increased new form of small cell network, e.g., Microcell, Picocell and Femtocell, etc., accordingly, as well as new network access points (also called as network nodes) to provide service for different business requirements, and to provide favorable coverage for local area).

The coexisting of new network nodes with Macro-cellular network enables to solve the coverage problem of local area, and to increase data rate. The network nodes in one network share a section of spectrum resource, and each network node may use a number of spectrum resource collections, such as resource block (RB), sub-channel, component carrier (CC), etc. However, due to the lack of centralized control device, it unable to proceed network programmer as the conventional cellular network, and some network nodes (such as small cell) exist by self-organization, thereby causing the interference among different transmission links of network nodes and the decrease of spectrum efficiency; at the same time, when users turn on or off those devices, the topology of the network will dynamic change, then the existing nodes in the network should adapt to the change, as a result, the spectrum allocation of the dynamic network needs to be deeply investigated.

Currently, some scholars have investigated the distributed spectrum allocation algorithm of the dynamic network, and have provided various methods based on game theory. For example, in a non-cooperative game theory-based resource allocation algorithm, each network node may autonomously obtain spectrum resource according to the corresponding utility function, which can be autonomously set according to different optimization goals, i.e., number of resources, throughput and the like. However, those non-cooperative game methods need a certain iterations to achieve equilibrium, and that there is still a performance gap when compared with the corporation-based algorithm. Likewise, some scholars provides a coalition game-based resource allocation algorithm, in which by sending coalition formation requests (CFR), the new added network nodes request the original nodes release spectrum resource for its use; therein, the new added nodes determine the resource allocation of both themselves and those existing neighbor modes, thus the equality among network nodes can not be maintained.

SUMMARY OF THE PRESENT INVENTION

In view of the above disadvantages of the prior art, the object of the present invention is to provide a spectrum allocation method for cellular network, which method can ensure the fairness of resource allocation among the network nodes.

In order to achieve the above object and other related objects, the present invention provides a spectrum allocation method for cellular network.

A spectrum allocation method for cellular network, characterized in that, the spectrum allocation method comprises:

a) Constructing a graph theory model of spectrum allocation: abstracting a network into an interference pattern, Therein, each network node is abstracted and is mapped to a vertex in the interference pattern, the existing conflict or interference between two network nodes is mapped to the edge between two vertexes;

b) Establishing a stakeholder list for each network node, the stakeholder list comprises the information of a network node that cannot use the same spectrum resource unit with said network node; the mapping vertex of the contained network node in a stakeholder list in the interference pattern, and the mapping vertex of the network node establishing the stakeholder list is linked by an edge; each network node calculates its own largest value of maximal clique label of the interference pattern according to the obtained information by the stakeholder list; each network node sends the itself established or updated stakeholder list and its own largest value of maximal clique label to other network node in the considered network;

c) Each network node periodically or event triggered listens for network status, if the number $A_n$ of spectrum resource units being used by a network node n is less than a lower bound value $K_n$, then the network node n selects more spectrum resource units until occupies $K_n$ spectrum resource units; where $K_n$ is related to the total number of spectrum resource units being used in the considered network and the largest value of maximal clique label of the network node;

If $A_n \geq K_n$, and the number $E_n$ of the spectrum resource units of the network node n being competed with the network node of stakeholder is equal to zero, the network node n competes for the remaining $K'_n - K_n$ spectrum resource units with a predetermined probability, until there is no free spectrum resource unit anymore; where $K'_n$ represents an upper bound value of the number of spectrum resource units being used by network node n; $C_i$ represents the ith maximal clique which the abstracted vertex $V_n$ of the network node n belongs to, vertex $V_k$ represents the vertex except for the vertex $V_n$ in $C_i$, $n \leq N$, N represents the total number of the network node in the considered network, I represents total number of the maximal clique which vertex $V_n$ belongs to; $\lceil \cdot \rceil$ represents rounded up;

If $A_n > K_n$, and $E_n > 0$, the network node n releases the spectrum resource units being competed;

If $A_n = K_n$, and $E_n > 0$, the network node n firstly releases the spectrum resource units being competed, then selects $K'_n - K_n$ spectrum resource units not being competed in the spectrum resource units.

As a preferred embodiment of the present invention, If $A_n \geq K_n$, and $E_n = 0$, the network node n competes for the remaining $K'_n - K_n$ spectrum resource units with a predetermined probability, until there is no free spectrum resource unit anymore. One of the obtained modes of the predetermined probability is: order $I_n = \arg\max q_{ni}$ represent a clique with largest number of vertex in the maximal clique which the network node n belongs to, then the predetermined probability value is $$p_n = \frac{1}{Q_n - \|\{k \mid k \neq n, k \in C_{l_n}, Q_k > Q_n\}\|}.$$

As another preferred embodiment of the present invention, the spectrum resource unit is resource block, sub-band, component carriers, a set of resource blocks, a set of sub-band, or a set of component carriers.

As another preferred embodiment of the present invention, when the topology of the considered network is a ring with an odd number of vertices, i.e., N is an odd number, the network node needs to count the conflicts, and donates as $N_c$; if $N_c$ is larger than the preset threshold value, then decrease $K_n$, make $K_n=K_n-\Delta$, therein $\Delta$ is a adjustment D-value, and reset $N_c$.

As another preferred embodiment of the present invention, the considered networks are partly or entirely substituted by macro base stations, and/or micro base stations, and/or pico base stations, and/or other infrastructure nodes.

From the above, the spectrum allocation method for cellular network of the present invention has the following beneficial effects:

1) Through the distributed spectrum allocation method of the present invention, each network nodecan determine the spectrum allocation according to its own fairness coefficient, and to ensure the fairness among network nodes.

2) In order to ensure fairness and make full use of the spectrum resources, only the initial or updated stakeholder list and the maximal clique label are sent to other network nodes, as a result, the signaling overhead is very small, and is in an acceptable range.

3) The method of the present invention may be effectively used and extended in the non-coordinated cellular network, and is not subject to the constraints of the network topology.

DETAILED DESCRIPTION OF THE PREFERRED EMBODIMENTS

The embodiment modes of the present invention are described hereunder through specific examples, and persons skilled in the art may easily understand other advantages and efficacies of the present invention from the contents disclosed in the present description. The present invention may be further implemented or applied through other different specific embodiment modes, and various modifications or amendments may also be made to each of the details in the present description based on different perspectives and applications without departing from the spirit of the present invention.

Please refer to figures. It is to be noted that the drawings provided in the present embodiment only explain the basic conception of the present invention in an illustrative manner, so the drawings only display the components relevant to the present invention rather than being drawn according to the number, shape and size of the components during actual implementation, the shape, number and scale of each component may be randomly changed during its actual implementation, and the layout of the components thereof might also be more complicated.

Hereinafter, the specific embodiments of the present invention are further described in detail with reference to the figures.

First Embodiment

Figure 1:
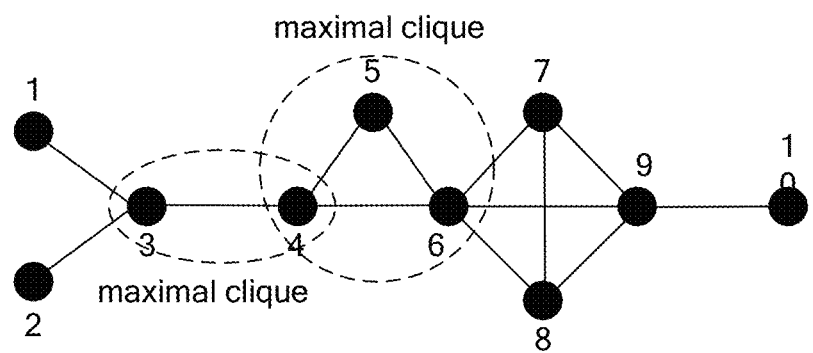
FIG. 1 is a schematic diagram of a maximal clique of a network structure being abstracted to an interference pattern.
Figure 2:
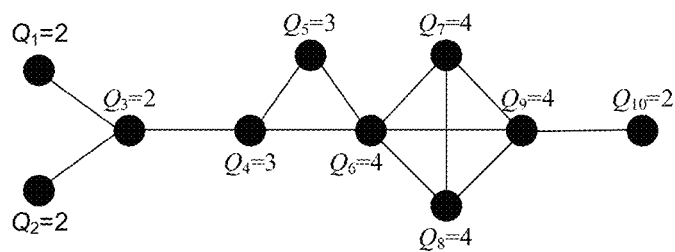
FIG. 2 is a schematic diagram of a maximal clique label of a network structure being abstracted to an interference pattern.

The present embodiment provides a spectrum allocation method for dynamic Femto network, the spectrum allocation method for dynamic Femto network comprises the following contents:

Referring to FIG. 1, the Femto network is abstracted to an interference graph G=(V, E), therein, V={1, . . . , n} is a vertex set of graph G, E⊆V×V is an edge set of graph G; each vertex represents a Femto, and an edge between two vertexes represents that there is a conflict or interference between two Femtos; n represents the number of vertexes, n is a positive integer, $V_n$ represents a nth vertex, and $V_n$ also represents Femto n;

Clique of graph G refers to a vertex set with an edge between any two vertexes; if one clique is not contained in any other clique, the clique is called as a maximal clique C={1, . . . ,I} of graph G, I represents the number of maximal cliques, I is a positive integer, $C_i$ represents a ith maximal clique, 1≤i≤I;

Referring to FIG. 2, $V_n \in C_i$ represents that vertex $V_n$ is in maximal clique $C_i$, $q_{ni}$ is used to represent the number of vertexes of maximal clique $C_i$ that contains vertex $V_n$, a value of a maximal clique label of vertex $V_n$ is $Q_n = \max q_{ni}$;

$c_{nk}$ represents the interference relationship between vertex $V_n$ and vertex $V_k$; $c_{nk}=1$ represents that Femto n and Femto k can not use the same spectrum resource unit; $c_{nk}=0$ represents that Femto n and Femto k can use the same spectrum resource unit;

Each Femto establishes a stakeholder list, and the stakeholder list comprises the information of a Femto that can not use the same spectrum resource unit with said Femto; the mapping vertex of the contained Femto in a stakeholder list in the interference pattern, and the mapping vertex of the Femto that establishes the stakeholder list is linked by an edge; each Femto calculates its own largest value of maximal clique label of the interference pattern according to the obtained information by the stakeholder list; each Femto sends the itself established or updated stakeholder list and its own largest value of maximal clique label to other Femtos in the Femto network.

Suppose that a Femto network consists of N Femtos, the total number of spectrum resource units for the network is M, then the lower bound value of the number of spectrum resources being used by a Femto n is $$K_n = \left\lfloor \frac{M}{Q_n} \right\rfloor, \lfloor \cdot \rfloor$$

represents rounded down; the upper bound value of the number of spectrum resources being used by the Femto n is $K'_n = \lceil M \cdot T_n \rceil$, $\lceil \cdot \rceil$ represents rounded up; wherein $$T_n = \min_{1 \le i \le I, V_n \in C_i} (1 - t_{ni}), \quad t_{ni} = \sum_{V_k \in C_i, V_n \in C_i, k \ne n} \frac{1}{Q_k};$$

$n \le N$; the forms of spectrum resource units may be various, such as various forms of resource block, sub-band, component carriers, or a set of component carriers, and the like, but the protection scope of the spectrum resource units of the present invention is not limited to the above several listing forms.

Figure 3:
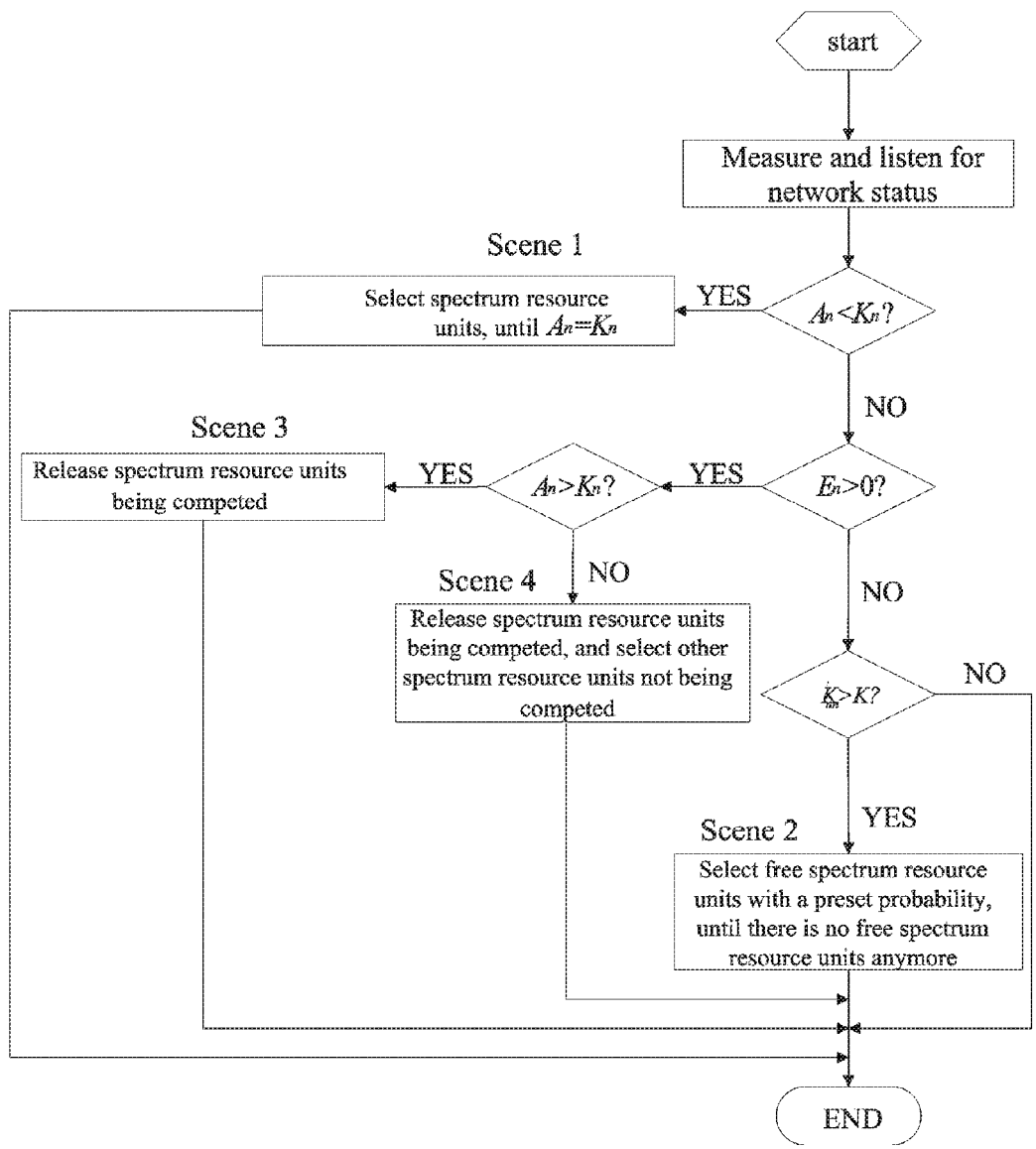
FIG. 3 is a flow diagram of a spectrum allocation method for dynamic network of the present invention.

Order $a_{nm}$ represent that Femto n makes use of a mth spectrum resource unit, $m \le M$; $a_{nm}=0$ represents Femto n can not use the mth spectrum resource unit, $a_{nm}=1$ represents Femto n use the mth spectrum resource unit;

Order $d_{nm}$ represent that whether $a_{nm}$ is changed from 0 to 1 after a resource allocation time slot, $d_{nm}=1$ represents $a_{nm}$ is is changed from 0 to 1; $d_{nm}=0$ represents $a_{nm}$ is still 0.

$$\text{Order } e_{nm} = \begin{cases} 1 \text{ if } \sum_{k=1, k \ne n}^{N} a_{nm} d_{km} c_{nk} > 0 \\ 0 \text{ if } \sum_{k=1, k \ne n}^{N} a_{nm} d_{km} c_{nk} = 0 \end{cases}, \quad A_n = \sum_{m=1}^{M} a_{nm}$$

represents the number of the spectrum resource units being used by the Femto n, $$E_n = \sum_{m=1}^{M} e_{nm}$$

represents the number of the spectrum resource units being competed with the Femto of stakeholders Referring to FIG. 3, each Femto periodically listens for network status, and carries out different instructions according to the different listened results, such as:

If $A_n < K_n$, the Femto n selects more spectrum resource units until occupies $K_n$ spectrum resource units.

If $A_n \ge K_n$, and $E_n = 0$, the Femto n competes for the remaining $K'_n - K_n$ spectrum resource units with a predetermined probability, until there is no free spectrum resource unit anymore; there are several obtained modes of the predetermined probability, and herein list one mode: order $I_n = \arg\max_i q_{ni}$ represent a clinque with largest number of vertexes in the maximal clique which the Femto n belongs to, then the predetermined probability value is $$p_n = \frac{1}{Q_n - \|\{k \mid k \ne n, k \in C_{I_n}, Q_k > Q_n\}\|}.$$

The obtained mode of the predetermined probability of the present invention is not limited to the mode list in the invention, and some other setting modes may also be adopted on the basis of practical situation.

If $A_n > K_n$, and $E_n > 0$, the Femto n releases the spectrum resource units being competed;

If $A_n = K_n$, and $E_n > 0$, the Femto n firstly releases the spectrum resource units being competed, then selects $K'_n - K_n$ spectrum resource units not being competed of the spectrum resource units.

The Femtos of the network are partly or entirely substituted by macro base stations, and/or micro base stations, and/or pico base stations, and/or other infrastructure nodes. In other words, the spectrum allocation method of the present invention is not only suitable for the network being consist of Femtos, but also suitable for the multi-node dynamic network being consist of macro base station, micro base stations, pico base stations and other infrastructure nodes. Namely, the protection scope of the spectrum allocation method of the present invention is not limited to the Femto network, but capable for an arbitrary multi-node network.

In the invention, each Femto establishes a stakeholder list to represent its relationship with other Femtos, and the Femto and those Femtos in the stakeholder list are sensitive to the sharing of spectrum resources, e.g., they can not use the same spectrum resource. When a stakeholder list is established or updated, it would be sent out, and then each Femto would learn the relationship of two neighbors, thereby, Femto n would be aware of the number of resources it may at least use but without bringing in extra interference for the neighbors, and the lower bound is defined as a fairness coefficient K in the invention. In the meanwhile, the Femto n would send a maximal clique label Q, to other Femtos, then the Femto n may acquire a upper bound value $K'_n$ of the resources according to the calculation of the obtained information, so as to effectively compete for free resource. Each Femto can autonomously select spectrum resources according to the defined fairness coefficient, and make full use of resource and achieve global fairness by competing for free frequency spectrum Each Femto also can select resource according to the specific scene and corresponding allocation rule of frequency spectrum, and the specific allocation rule is as follows:

If the obtained number of resources of Femto n is less than $K_n$, then greedily select frequency spectrum resources until the obtained number of resources reaches $K_n$.

If the obtained number of resources of Femto n reaches $K_n$, and the resources are not shared with stakeholders, then select the free resource not being used by stakeholders with probability $p_n$, until all the resources are used.

If the obtained number of resources of Femto n is larger than $K_n$, and a resource being used is competed by stakeholders, then release the resource being competed.

If the obtained number of resources of Femto n is no more than $K_n$, and a resource being used is competed by stakeholders, firstly release the resource being competed, then select other resources. This kind of competition would continually pass on, until reaches the boundary of network.

Though mutual information interaction, the spectrum allocation method for dynamic Femto network of the present invention achieves autonomously selection of spectrum resources by taking network fairness into account, and ensure the fully use of spectrum resource.

As can be see from the above technical solution, the present invention has the following advantages:

1) Through the distributed spectrum allocation method of the present invention, each Femto can determine the spectrum allocation according to its own fairness coefficient, and to ensure the fairness among Femtos.

2) In order to ensure fairness and make full use of the spectrum resource, only the initial or updated stakeholder list and the maximal clique label are sent to other Femtos, as a result, the signaling overhead is very small, and is in an acceptable range.

3) The method of the present invention may be effectively used and extended in the non-coordinated Femto network, and is not subject to the constraints of the network topology.

Second Embodiment

In the embodiment, the spectrum resource unit is identified as a component carrier, and by taking the component carrier as an example, a specific implementation process is illustrated, which process includes the following contents:

Firstly, construct a spectrum allocation model based on graph theory:

A Femto network can be abstracted into an interference pattern, in which each vertex represents one Femto, and an edge between two vertexes represents that there is a conflict or interference between two Femtos. In a practical system, this conflict or interference relationship can be obtained by measuring the magnitude of interference or route loss by user equipment (UE) or Femto. Generally, if an edge is linked by two vertexes, then these two Femtos can not use a same spectrum resource at the same time. For convenience, in the embodiment, component carrier is substituted by using an English abbreviation CC, and Femto is substituted by a 3GPP term of HeNB.

For a given graph G=(V, E), therein, V={1, . . . , n} is a vertex set of graph G, E⊆V×V is a edge set of graph G. Clique of graph G refers to a vertex set with an edge between any two vertexes. If one clique is not contained in any other clique, then it is not a proper sunset of any other cliques, and the clique is called as a maximal clique. A vertex may belong to multiple maximal cliques, as shown in FIG. 1, vertex 4 not only belongs to the maximal clique formed by vertex 3 and vertex 4, but also belongs to the maximal clique formed by vertex 4, vertex 5 and vertex 6. $V_n \in C_i$ is used to represent that vertex $V_n$ is in maximal clique $C_i$, $q_{ni}$ is used to represent the number of vertexes of maximal clique $C_i$ that contains vertex $V_n$, then a value is given to vertex $V_n$ that $Q_n$=max $q_{ni}$, and called as a maximal clique label, as shown in FIG. 2.

$c_{nk}$ is used to represent the interference relationship between vertex $V_n$ and vertex $V_k$, namely, $c_{nk}$ represents the interference relationship between HeNB n and HeNB k:

$$c_{nk} = \begin{cases} 0 & \text{satisfy with a definite judged condition} \\ 1 & \text{or else} \end{cases} \quad (1)$$

Therein, $c_{nk}$=1 represents that HeNB n and HeNB k can not use the same spectrum resource, and apparently satisfy $c_{nk}$=$c_{kn}$. $c_{nk}$=1 represents that Femto n and Femto k can not use the same spectrum resource unit; $c_{nk}$=0 represents that Femto n and Femto k can use the same spectrum resource unit.

Based on the above information, each HeNB may establish one table, and we name it stakeholder list, as shown in FIG. 1. When the stakeholder list is established or updated, it would be sent to other Femtos. Since the information interaction of the stakeholder list, HeNB n may obtain a two-tier interference relationship, and calculate $Q_n$, value. The stakeholder list may be in the form of a cell list, which is similar to the defined neighbour information in 3GPP, while both have essential difference. In the criterion of 3GPP, neighbour infotmation is the information being sent to adjacent base station via a X2 interface by a base station (eNB), including a instruction of cell that it served, e.g., ECGI, PCI and the like. Thus, after receiving the neighbour information sent by multiple adjacent base stations, the target base station would know its neighbor list; otherwise, the stakeholder list contains the information of a Femto that can not use the same spectrum resource unit with said Femto, and after receiving the information, the target base station would be aware of the neighbour information of a neighbour, and we name it a two-tier neighbor, and HeNB n can calculate Q value according to the two-tier neighbour information.

TABLE 1

A sample table of a stakeholder list of the network as shown in FIG. 2

| | Stakeholder List |
|---|---|
| HeNB1 | HeNB3 |
| HeNB2 | HeNB3 |
| HeNB3 | HeNB1, HeNB2, HeNB4 |
| HeNB4 | HeNB3, HeNB5, HeNB6 |
| HeNB5 | HeNB4, HeNB6 |
| . . . | . . . |

Suppose that a network consists of N Femtos, and may use M component carriers (CC), then HeNBn may at least use $$K_n = \left\lfloor \frac{M}{Q_n} \right\rfloor$$

CC to ensure the HeNB in a maximal clique can obtain CC with almost same quantity; in the meanwhile, the total number obtained in one maximal clique is no more than M, that is due to some HeNB in the maximal clique may also belong to a larger maximal clique, thus it is possible that some CC are not occupied by the HeNB in the maximal clique, and we name it free spectrum resource (free CC), which can be competed for use; herein, ⌊•⌋ represents integer arithmetic.

In order to make efficiently use of spectrum resource, each HeNB would send $Q_n$ value out. Thus, $$t_{ni} = \sum_{V_k \in C_i, V_n \in C_i, k \neq n} \frac{1}{Q_k}$$

can be used to represent that if the number of CC used by other HeNB is a lower bound value of allowed amount, i.e., HeNBk use $$K_k = \left\lfloor \frac{M}{Q_k} \right\rfloor CC;$$

order $$T_n = \min_{1 \leq i \leq I, V_n \in C_i} (1 - t_{ni}),$$

then the upper bound value of the used amount of CC by HeNBn is $K'_n = \lceil M \cdot T_n \rceil$, and $\lceil \cdot \rceil$ represents round arithmetic.

Order $a_{nm}$ represent that HeNBn uses CC m, and CC In represents the mth CC, therein, in is less than or equal to M, and is defined as:

$$a_{nm} = \begin{cases} 0 & HeNB\ n\ use\ CC\ m \\ 1 & HeNB\ n\ does\ not\ use\ CC\ m \end{cases} \quad (2)$$

$a_{nm}=0$ represents that the Femto n does not use the mth CC; $a_{nm}=1$ represents that the Femto n use the mth CC.

Oder $d_{nm}$ represent that whether $a_{nm}$ is is changed from 0 to 1 after a resource allocation time slot, namely HeNBn knows which neighbors are competed for CC in, with the expression as shown in formula (3). If, in HeNB n, $d_{km}=1$ (1(k≠n), then it represents that HeNB k and HeNB n compete for CC m, and generate conflict. When HeNB n needs to reselect CC, it firstly selects the CC not being used by the neighbors that competes for resource with HeNB n, and if there is no such kind of CC, it would reselect the CC being used by the competitive neighbors, but not the CC being competed by neighbors, so as to avoid the generation of ping-pong effect.

$$d_{nm} = \begin{cases} 1 & \text{the last allocation time slot } a_{nm} \text{ is changed from 0 to 1} \\ 0 & \text{or else} \end{cases} \quad (3)$$

Order $$e_{nm} = \begin{cases} 1 & if \sum_{k=1, k \neq n}^{N} a_{nm} d_{km} c_{nk} > 0 \\ 0 & if \sum_{k=1, k \neq n}^{N} a_{nm} d_{km} c_{nk} = 0 \end{cases}, A_n = \sum_{m=1}^{M} a_{nm}$$

represents the number of the spectrum resource units being used by the Femto n, $$E_n = \sum_{m=1}^{M} e_{nm}$$

represents the number of the spectrum resource units being competed with the Femto of stakeholders.

Thus there are four kinds of scenes for spectrum allocation, as shown in table 2:

TABLE 2

Scenes for spectrum allocation

| Cases | $A_n$ | $E_n$ |
|---|---|---|
| 1 | $<K_n$ | — |
| 2 | $\geq K_n$ | =0 |
| 3 | $>K_n$ | >0 |
| 4 | $=K_n$ | >0 |

FIG. 3 is shown to a flow chart of spectrum allocation, in which each HeNB periodically listens for network status, and carries out the next action according to the given criterion, with the detailed criterion of the spectrum allocation as follows:

Scene 1: since the number of CC being used by HeNBn is less than the low bound that can be occupied, namely $A_n < K_n$, thus Femto n would greedily select more CC, until it occupies $K_n$CC.

Figure 5A:
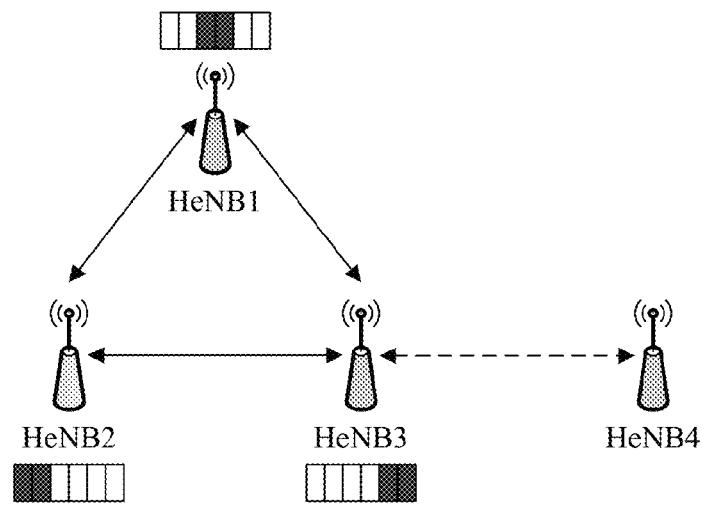
FIG. 5*a* is a schematic diagram of occupancy of spectrum resources before the addition of a new network node of the first scene.
Figure 5B:
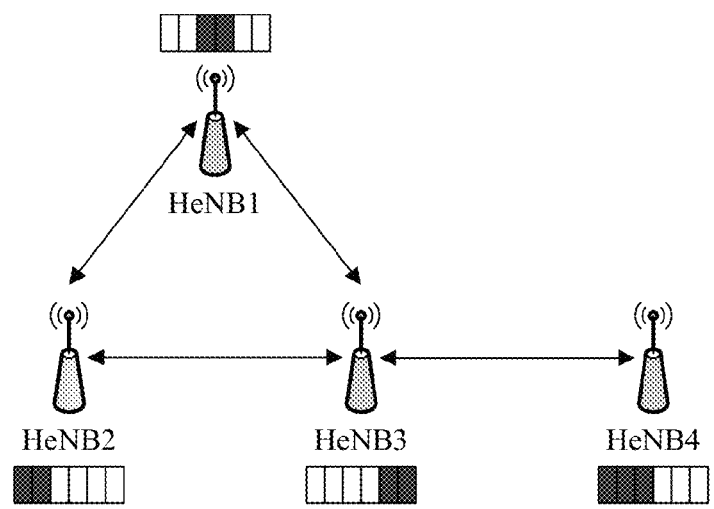
FIG. 5*b* is a schematic diagram of occupancy of spectrum resources after the addition of a new network node of the first scene.

As shown in FIG. 5a, HeNB1, HeNB2, and HeNB3 have already been in an activated state in a network, and the network may use 6 CCs. When HeNB4 enters the network, it calculates $Q_4$ by the information interaction with stakeholders, and $Q_4=2$ in FIG. 5a means that $K_4=3$. By this time, HeNB4 faces with the condition as shown in scene 1, and it would select three feasible CCs, e.g., CC1, CC2 and CC3. At this point, the network status is changed from FIG. 5a to FIG. 5b.

Scene 2: $A_n \geq K_n$, and $E_n=0$; in this scene, HeNBn have no conflict with its own stakeholders. If $K'_n \geq K_n$, then HeNBn would compete for the remaining $K'_n - K_n$ spectrum resource units with probability $p_n$, until there is no free CC anymore. Order arg max $I_n$=arg max$q_{ni}$ represent the clique with largest number of vertex in the maximal clique that the HeNBn belongs to, then the probality value can be calculated by $$p_n = \frac{1}{Q_n - \|\{k \mid k \neq n, k \in C_{I_n}, Q_k > Q_n\}\|}.$$

Figure 6A:
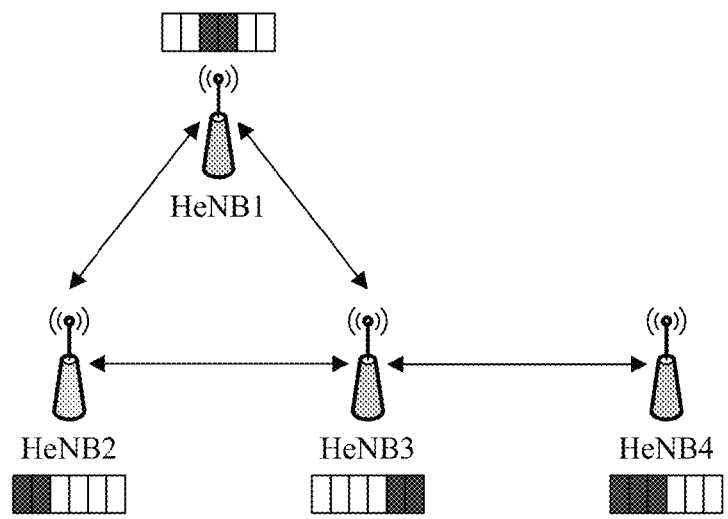
FIG. 6*a* is a schematic diagram of occupancy of spectrum resources before the addition of a new network node of the second scene.
Figure 6B:
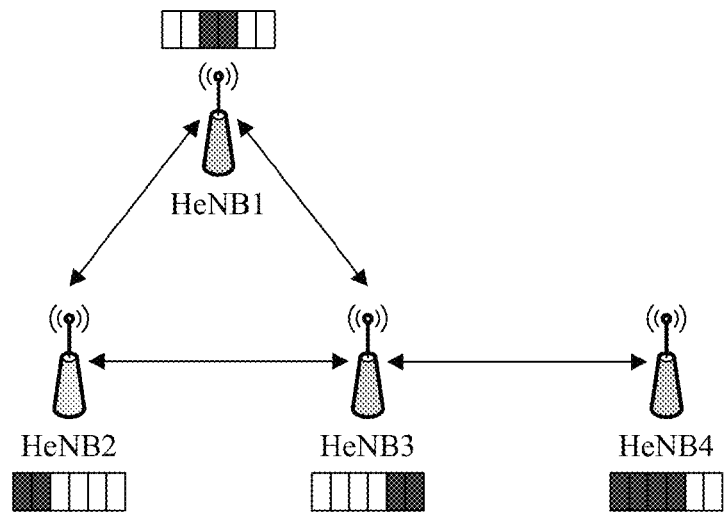
FIG. 6*b* is a schematic diagram of occupancy of spectrum resources after the addition of a new network node of the second scene.

As shown in FIG. 6a, HeNB4 faces with the condition as shown in scene 2, and it can be obtained by calculation that $K_n=3$ and $K'_n=4$, and it is found that CC4 has not been used by the neighbor HeNB3, thus HeNB4 selects CC4 with probability of $p_4=1$. At this point, the network status is changed from FIG. 6a to FIG. 6b.

Scene 3: if the conflict is caused by other HeNB (that is $E_n>0$), and $A_n>K_n$, then HeNB n releases the CC being competed.

Figure 7A:
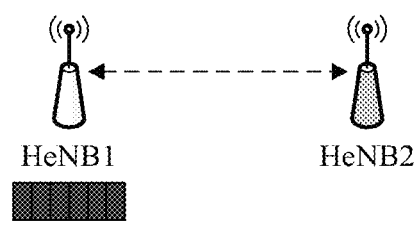
FIG. 7*a* is a schematic diagram of occupancy of spectrum resource before the addition of a new network node of the third scene.
Figure 7B:
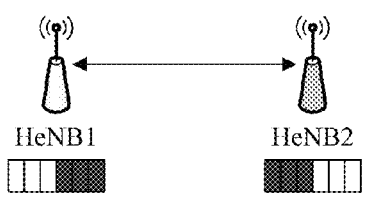
FIG. 7*b* is a schematic diagram of occupancy of spectrum resource after the addition of a new network node of the third scene.

As shown in FIG. 7a, HeNB2 enters a network, and selects 3 CCs according to the criterion of scene 1, e.g., CC1, CC2 and CC3, then HeNB1 faces with the condition in scene 3. HeNB1 found out the number of CC being occupied by itself is larger than $K_5=3$, thus it releases 3 CCs being competed by HeNB2. At this point, the network status is changed from FIG. 7a to FIG. 7b.

Scene 4: if the conflict is caused by other HeNB (that is $E_n>0$), and $A_n=K_n$, then HeNB n firstly releases the CC being competed, and then selects other CC not being competed.

Figure 8A:
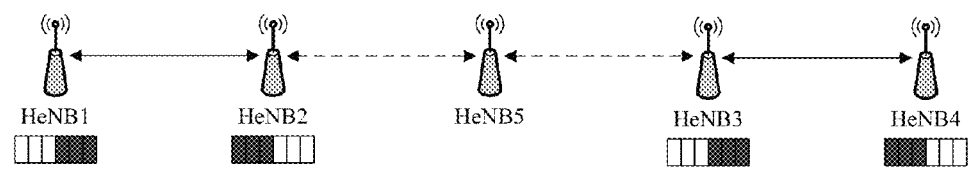
FIG. 8*a* is a schematic diagram of occupancy of spectrum resources before the addition of a new network node of the fourth scene.
Figure 8B:
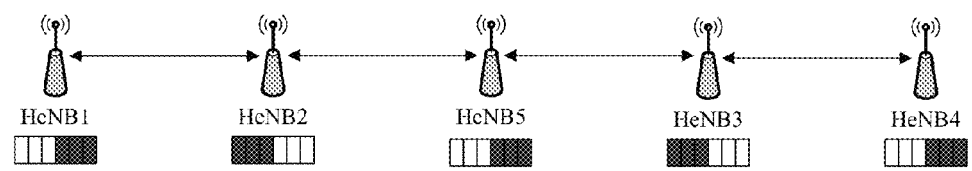
FIG. 8*b* is a schematic diagram of occupancy of spectrum resources after the addition of a new network node of the fourth scene.

As shown in FIG. 8a, HeNB5 enters a network, and selects 3 CCs, e.g. CC4, CC5 and CC6. In the subsequent process, HeNB3 and HeNB4 would sequentially face with the condition in scene 4, then HeNB3 releases the CC being competed by HeNB5 and selects other CC; similarly, when HeNB4 faces with the competition of HeNB5, it would release the CC being competed and selects other CC. At this point, the network status is changed from FIG. 8a to FIG. 8b.

Third Embodiment

Figure 4:
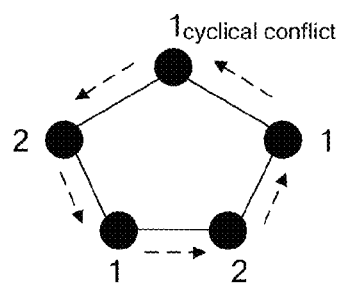
FIG. 4 is a diagram of a scene that a topology of a network is a ring with an odd number of vertices of the third embodiment.

The embodiment provides a spectrum allocation method for dynamic Femto network, and the distinction with the second embodiment is that: the topology of the Femto network is a ring with an odd number of vertices, that is N is an odd number, and it may cause a case of cyclical conflict, as shown in FIG. 4. According to the calculated $K_n$, each Femto can use a half of the spectrum resources, by which it would cause the conflict among neighbors, and such kind of conflict would be in a constant cycle along with the ring-shaped network. In order to avoid this case, the Femto n needs to count the conflicts, and donates as $N_c$; if $N_c$ is larger than the preset threshold value, then decrease $K_n$, make $K_n = K_n - \Delta$, therein $\Delta$ is a adjustment D-value, and is set as $$\Delta = \left\lceil \frac{M}{6} \right\rceil,$$

and reset $N_c$, therein, M represents the total number of the spectrum resource units. When the network topology changes, it needs to recalculate $K_n$ and to reset $N_c$. The adjustment D-value $\Delta$ is not limited to the calculation mode provided in the embodiment, and it can be calculated via any mode according to the actual requirement.

The abovementioned embodiments only illustratively describe the principle and efficacy of the present invention, rather than being used to limit the present invention. Any person skilled in the art may modify or amend the abovementioned embodiments without departing from the spirit and scope of the present invention. Thus, all equivalent modifications or amendments accomplished by persons having common knowledge in the technical field concerned without departing from the spirit and technical thoughts revealed by the present invention shall still be covered by the claims of the present invention.

What is claimed is:

1. A spectrum allocation method for a cellular network including a small cell network, the spectrum allocation method comprising:
   a) constructing a graph theory model of spectrum allocation including abstracting a cellular network into an interference pattern where each network node is abstracted and mapped to a vertex in the interference pattern, and an existing conflict or interference between two network nodes is mapped to the edge between two vertexes;
   b) establishing or updating a stakeholder list for each network node, the stakeholder list including information of a network node that cannot obtain the same spectrum resource unit of another network node established with the stakeholder list; a mapping vertex of the contained network node in the stakeholder list in the interference pattern, and a mapping vertex of the network node establishing the stakeholder list is linked by an edge; each network node calculates a largest value of maximal clique label of the interference pattern according to the stakeholder list; each network node transmits the established or the updated stakeholder list and the largest value of maximal clique label to other network nodes in the network;
   c) each network node listening periodically or triggered by an event for a status of the network, and if the number $A_n$ of spectrum resource units obtained by a network node n is less than a lower bound value $K_n$, then the network node n selects more spectrum resource units until $K_n$ spectrum resource units are obtained; where $K_n$ is the total number of spectrum resource units obtained in the network and the largest value of maximal clique label of the network node and network node n includes at least one network node;
   if $A_n \geq K_n$, and the number $E_n$ of the spectrum resource units of the network node n being competed with the stakeholder list being equal to zero, the network node n competes for the remaining $K'_n - K_n$ spectrum resource units with a predetermined probability, until there is no free spectrum resource unit anymore; where $K'_n$ represents a upper bound value of the number of spectrum resource units being used by network node n;
   if $A_n > K_n$, and $E_n > 0$, the network node n releases the spectrum resource units being competed;
   if $A_n = K_n$, and $E_n > 0$, the network node n first releases the spectrum resource units being competed, and then selects $K'_n - K_n$ spectrum resource units not being competed in the spectrum resource units.

2. The spectrum allocation method for network according to claim 1, wherein:
   $C_i$ represents the ith maximal clique that the abstracted vertex $V_n$ of the network node n belongs to, vertex $V_k$ represents the vertex except for the vertex $V_n$ in $C_i$, $n \leq N$, N represents a total number of the network nodes in the considered network, I represents a total number of the maximal cliques that vertex $V_n$ belongs to;
   if $A_n \geq K_n$, and $E_n = 0$, the network node n competes for the remaining $K'_n - K_n$ spectrum resource units with a predetermined probability, until there is no free spectrum resource unit available;
   one of the obtained modes of the predetermined probability is: order $I_n$, which represents a clique with the largest number of vertices in the maximal clique that the network node n belongs to, and then the predetermined probability value $p_n$ is $$p_n = \frac{1}{Q_n - \|\{k \mid k \neq n, k \in C_{I_n}, Q_k > Q_n\}\|};$$

and
   where network node k represents at least one network node that does not correspond to network node n, $C_{I_n}$ a maximal clique based on $I_n$, $Q_k$ represents a maximal clique of network node k, and $Q_n$ represents a maximal clique of network node n.

3. The spectrum allocation method for the cellular network according to claim 1, wherein the spectrum resource unit is resource block, sub-band, component carriers, a set of resource blocks, a set of sub-band, or a set of component carriers.

4. The spectrum allocation method for the cellular network according to claim 1, wherein:
   when the topology of the network is a ring with an odd number of vertices such that N is an odd number, the network node counts conflicts, and donates $N_c$; and
   if $N_c$ is larger than the preset threshold value, then: (i) $K_n$ is decreased, (ii) $K_n = K_n - \Delta$, where $\Delta$ is an adjustment D-value, and (iii) and $N_c$ is reset.

5. The spectrum allocation method for the cellular network according to claim 1, wherein, the network nodes of the network are partly or entirely substituted by macro base stations, and/or micro base stations, and/or pico base stations, and/or other infrastructure nodes.

6. The spectrum allocation method for the cellular network according to claim 2, wherein, the network nodes of the network are partly or entirely substituted by macro base stations, and/or micro base stations, and/or pico base stations, and/or other infrastructure nodes.

7. The spectrum allocation method for the cellular network according to claim 3, wherein, the network nodes of the network are partly or entirely substituted by macro base stations, and/or micro base stations, and/or pico base stations, and/or other infrastructure nodes.

8. The spectrum allocation method for the cellular network according to claim 4, wherein, the network nodes of the network are partly or entirely substituted by macro base stations, and/or micro base stations, and/or pico base stations, and/or other infrastructure nodes.

* * * * *